US011376768B2

(12) United States Patent
Kuruvilla et al.

(10) Patent No.: US 11,376,768 B2
(45) Date of Patent: Jul. 5, 2022

(54) PACKAGING TRAY AND METHOD OF MANUFACTURE

(71) Applicant: Tekni-Plex, Inc., Wayne, PA (US)

(72) Inventors: Babu Kuruvilla, Duluth, GA (US); Joe Labadie, Perrysburg, OH (US); Roger Lichtle, Decatur, IN (US); Mark A. Bergeron, Monroe, GA (US); Rafael Rivera, Jr., Dacula, GA (US)

(73) Assignee: Tekni-Plex, Inc., Wayne, PA (US)

( * ) Notice: Subject to any disclaimer, the term of this patent is extended or adjusted under 35 U.S.C. 154(b) by 181 days.

(21) Appl. No.: 16/739,795

(22) Filed: Jan. 10, 2020

(65) Prior Publication Data

US 2020/0223109 A1    Jul. 16, 2020

Related U.S. Application Data

(63) Continuation of application No. 62/793,187, filed on Jan. 16, 2019.

(51) Int. Cl.
| | |
|---|---|
| *B29C 43/02* | (2006.01) |
| *B65D 1/34* | (2006.01) |
| *B29C 43/18* | (2006.01) |
| *B29C 43/00* | (2006.01) |
| *B29L 31/00* | (2006.01) |

(52) U.S. Cl.
CPC .......... *B29C 43/021* (2013.01); *B29C 43/003* (2013.01); *B29C 43/18* (2013.01); *B65D 1/34* (2013.01); *B29C 2043/023* (2013.01); *B29C 2791/002* (2013.01); *B29L 2031/712* (2013.01)

(58) Field of Classification Search
None
See application file for complete search history.

(56) References Cited

U.S. PATENT DOCUMENTS

| | | | |
|---|---|---|---|
| 4,071,598 A | 1/1978 | Meadors | |
| 8,920,892 B2 | 12/2014 | Hernandez | |
| 9,908,281 B1 | 3/2018 | Wallace | |
| 10,118,332 B2 | 11/2018 | Wallace | |
| 10,189,624 B2 | 1/2019 | Wallace | |
| 10,562,680 B2 | 2/2020 | Wallace | |
| 2005/0109653 A1* | 5/2005 | Wnek | B65D 21/0233 206/515 |

(Continued)

FOREIGN PATENT DOCUMENTS

| | | |
|---|---|---|
| DE | 2643489 A1 | 4/1977 |
| EP | 0375513 A1 | 6/1990 |

(Continued)

OTHER PUBLICATIONS

International Search Report and Written Opinion in corresponding international application No. PCT/US2020/013109 dated Apr. 20, 2020.

(Continued)

*Primary Examiner* — Robert J Grun
(74) *Attorney, Agent, or Firm* — Polsinelli, P.C.

(57) ABSTRACT

Thermoplastic packaging trays are provided that are filled with a product and wrapped in film, and methods of producing the tray with a peripheral edge region that avoids tearing of the overwrap film. In various embodiments, the tray has a beaded, a flat, or a combined beaded and flat peripheral edge.

18 Claims, 24 Drawing Sheets

(56) References Cited

U.S. PATENT DOCUMENTS

2017/0320257 A1 11/2017 Van Tilborgh
2018/0105312 A1 4/2018 Mondin

FOREIGN PATENT DOCUMENTS

WO 199601179 1/1996
WO 2012064203 A1 5/2012
WO 2013103884 A1 7/2013
WO 2018160645 A1 9/2018

OTHER PUBLICATIONS

International Preliminary Report on Patentability in corresponding international application No. PCT/US2020/013109 dated Apr. 26, 2021.

* cited by examiner

PACKAGING TRAY AND METHOD OF MANUFACTURE

FIELD OF THE INVENTION

The present invention relates to plastic packaging trays that are filled with a product and wrapped in a plastic overwrap film, and methods of producing the tray with a peripheral edge region that avoids tearing of the overwrap film. In various embodiments, the tray has a beaded, a flat or a combined beaded and flat peripheral edge.

BACKGROUND

Thermoformed plastic trays are commonly used for packaging food, e.g., meat or produce, and other products. These trays are designed to be filled with a product and the filled tray then wrapped in a plastic film. However, the thermoforming process typically creates a very sharp peripheral edge on the thermoformed tray, either as formed or after cutting excess material from around the periphery of the tray, that will tear the film and thus expose the product in the package to spoilage or contamination. Tears can occur either during the wrapping process, or during handling and distribution to the consumer.

Prior attempts to form a smooth edge are often performed in the thermoforming mold, a hot forming process that involves further bending of the tray periphery so that it is disposed underneath the tray flange, adjacent the body of the container. However these processes require expensive equipment that must accommodate thermoforming, cutting and bending processes and as a result greatly increase not only the equipment cost but also the production time and cost of the finished tray.

SUMMARY OF THE INVENTION

The present invention relates to various embodiments of a plastic packaging tray, configured to be filled with a product and wrapped in plastic film, and methods of producing the tray with a peripheral edge region that avoids tearing of the overwrap film. The tray can be formed with a beaded, a flat, or a combined beaded and flat peripheral edge, each formed by a cold pressing process, which does not require a heating step and thus substantially reduces the cost of equipment and processing time.

In one embodiment, the plastic tray is produced from an intermediate plastic thermoformed article that includes a product recess for holding a product and a peripheral flange surrounding the product recess. The flange of the intermediate article has a sharp terminal edge that is then reconfigured, by cold pressing, to prevent the terminal edge from tearing the overwrap film. In one embodiment the cold pressing step is configured to increase a surface area for engagement by the film to produce a more secure and tear-resistant package.

In accordance with one embodiment of the invention, a method is provided for producing a plastic packaging tray having a peripheral edge region terminating in a terminal edge that is displaced out of a wrap path around the tray, the method comprising:
providing a thermoformed plastic intermediate article for forming the tray, the intermediate article having a peripheral flange terminating in the terminal edge,
cold pressing the peripheral flange of the intermediate article by bringing an appropriately configured compressing tool into engagement with the terminal edge to displace the terminal edge out of the wrap path,
wherein the method further comprises:
the peripheral flange of the intermediate article forming an open bead disposed at an outermost periphery of the article and a distal tail leg extending between the open bead and the terminal edge;
the compressing tool engaging the terminal edge of the leg to fully or partially close the open bead of the article and form a cold compressed peripheral edge region of the tray with the fully or partially closed bead at an outermost periphery of the tray.

In one embodiment, the cold compressed peripheral edge region of the tray comprises:
a) a beaded compressed edge with the fully or partially closed bead forming a compressed bead at the outermost periphery of the tray;
b) a flat compressed edge with the fully or partially closed bead forming a fold line at the outermost periphery and mating engaged upper and lower flange surfaces of the tray disposed inwardly from the outermost periphery; or
c) a combined beaded and flat compressed edge with the compressed bead at the outermost periphery and mating engaged upper and lower flange surfaces disposed inwardly from the outermost periphery of the tray.

In one embodiment, the cold pressing step comprises:
varying a degree by which the compressing tool displaces the terminal edge of the leg in order to vary the extent of fully or partially closing the open bead of the article, to form a compressed bead at the outermost periphery of the tray having a selected outer surface area for engagement with a wrap film disposed within the wrap path.

In one embodiment, the degree by which the compressing tool displaces the terminal edge produces a fully closed compressed bead at the outermost periphery of the tray.

In one embodiment, the degree by which the compressing tool displaces the terminal edge produces a partially closed compressed bead at the outermost periphery.

In one embodiment, a plastic packaging tray is produced by the method, wherein the thermoformed plastic intermediate article is formed with a product recess surrounded by the peripheral flange.

In one embodiment, the plastic packaging tray has the beaded compressed edge.

In one embodiment, the plastic packaging tray has the flat compressed edge.

In one embodiment, the plastic packaging tray has the combined beaded and flat compressed edge.

In one embodiment, the plastic packaging tray has a rectangular shaped outermost periphery with rounded corners.

In one embodiment, the peripheral flange has a proximal portion forming a top wall of the article disposed between the product recess and the open bead, and a distal portion including the open bead and distal tail leg.

In one embodiment, a dimple comprising a recess extends into an upper surface of the top wall and protrudes from a lower surface of the top wall.

In one embodiment, the terminal edge is disposed in the tray adjacent the lower surface of the top wall between the dimple and the outermost periphery of the tray.

In one embodiment a wrapped and filled plastic packaging tray is produced by the method, followed by filling the tray with a product and positioning a sheet of plastic wrap film over the tray and product disposed therein and pulling the sheet taut to engage the outermost periphery of the tray in the wrap path without engaging the terminal edge.

In one embodiment, the thermoformed plastic intermediate article comprises a monolayer or multi-layer article, and comprises a foam, solid or a combination of foam and solid material(s).

In one embodiment, the material(s) comprise one or more of polyolefin and polyester materials, in an amorphous or semi-crystalline state.

In one embodiment, the material(s) comprise one or more of amorphous polyethylene terephthalate, semi-crystalline polyethylene terephthalate, polypropylene, polystyrene, polyethylene, high density polyethylene, and the article has dimensions in ranges of: thickness from 0.01 to 0.06 inches, cavity depth from 0.5 to 2.5 inches, and top surface area from 5.0 inches in length×5.0 inches in width to 17 inches in length to 15 inches in width.

In accordance with another embodiment of the invention, an apparatus is provided for producing a plastic packaging tray having a peripheral edge region terminating in a terminal edge that is displaced out of a wrap path around the tray, the apparatus comprising:
  a tool body configured to hold a thermoformed plastic intermediate article for forming the tray, the intermediate article having a peripheral flange terminating in the terminal edge,
  a compressing tool for cold pressing the peripheral flange of the intermediate article by bringing an appropriately configured surface of the compressing tool into engagement with the terminal edge to displace the terminal edge out of the wrap path,
  wherein the tool body and compressing tool are configured to receive and displace the terminal edge of the peripheral flange, and:
    the peripheral flange forming an open bead disposed at an outermost periphery of the article and a distal tail leg extending between the open bead and the terminal edge;
    the compressing tool surface displacing the terminal edge of the leg to fully or partially close the open bead of the article and form a cold compressed peripheral edge region of the tray with the fully or partially closed bead at an outermost periphery of the tray.

In one embodiment, the tool body and compressing tool are configured to form the cold compressed peripheral edge region of the tray comprising:
  a) a beaded compressed edge with the fully or partially closed bead forming a compressed bead at the outermost periphery of the tray;
  b) a flat compressed edge with the fully or partially closed bead forming a fold line at the outermost periphery of the tray and mating engaged upper and lower flange surfaces disposed inwardly from the outermost periphery of the tray; or
  c) a combined beaded and flat compressed edge with the compressed bead at the outermost periphery and mating engaged upper and lower flange surfaces disposed inwardly from the outermost periphery of the tray.

In one embodiment, the apparatus is configured to:
  vary a degree by which the compressing tool displaces the terminal edge of the leg in order to vary the extent of fully or partially closing the open bead of the article, to form a compressed bead at the outermost periphery of the tray having a selected outer surface area for engagement with a wrap film disposed within the wrap path.

In one embodiment, the degree by which the compressing tool displaces the terminal edge produces a fully closed compressed bead at the outermost periphery of the tray.

In one embodiment, the degree by which the compressing tool displaces the terminal edge produces a partially closed compressed bead at the outermost periphery of the tray.

In one embodiment, a plastic packaging tray is produced by the apparatus, wherein the thermoformed plastic intermediate article is formed with a product recess surrounded by the peripheral flange.

In one embodiment, the apparatus is configured to produce the beaded compressed edge.

In one embodiment, the apparatus is configured to produce the flat compressed edge.

In one embodiment, the apparatus is configured to produce the combined beaded and flat compressed edge.

DETAILED DESCRIPTION

Figure 1A:
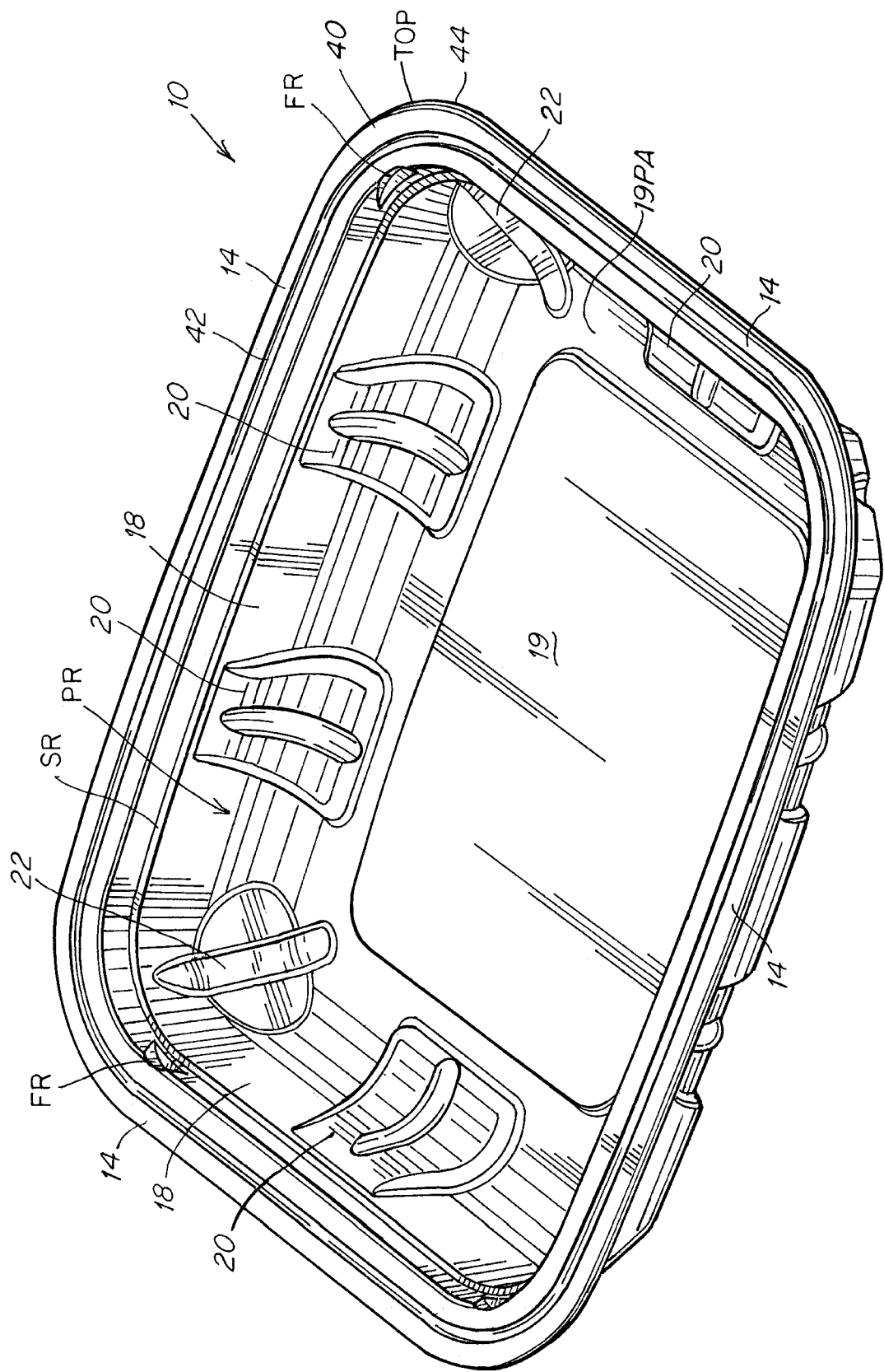
FIGS. 1A-1E are various views of a plastic packaging tray having a cold compressed flat peripheral edge according to one embodiment of the invention, FIG. 1A being a top perspective view, FIG. 1B a top plan view, FIG. 1C a bottom plan view, FIG. 1D a front elevational view, and FIG. 1E a front elevational view of the tray filled with a product P and wrapped in a flexible plastic film wrap W.

Referring now to the drawings, various embodiments of a tray having a cold compressed peripheral edge according to the invention are illustrated. The reference numerals in the drawings designate identical or corresponding parts throughout the several views.

First Embodiment

Figure 1B:
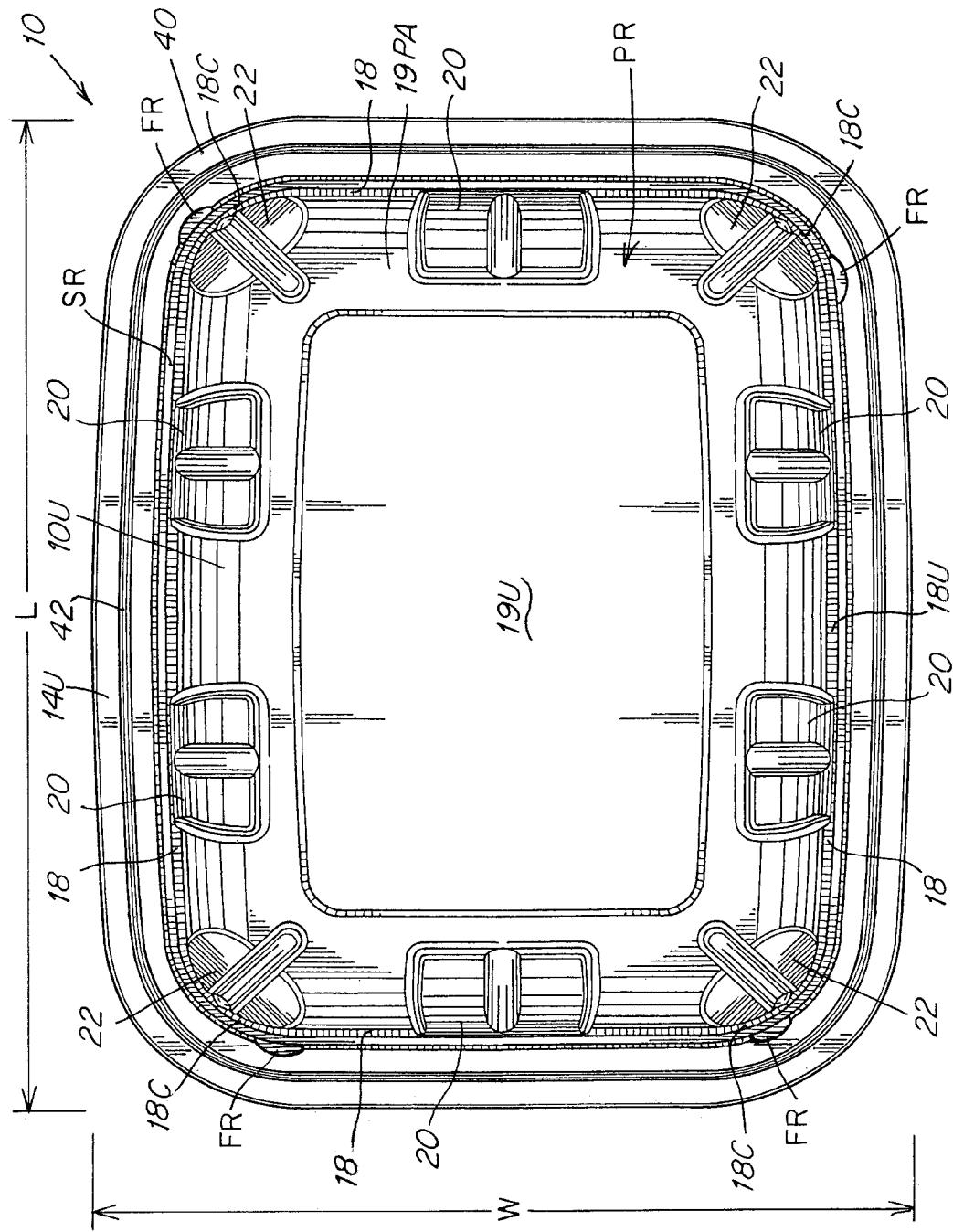
Figure 1C:
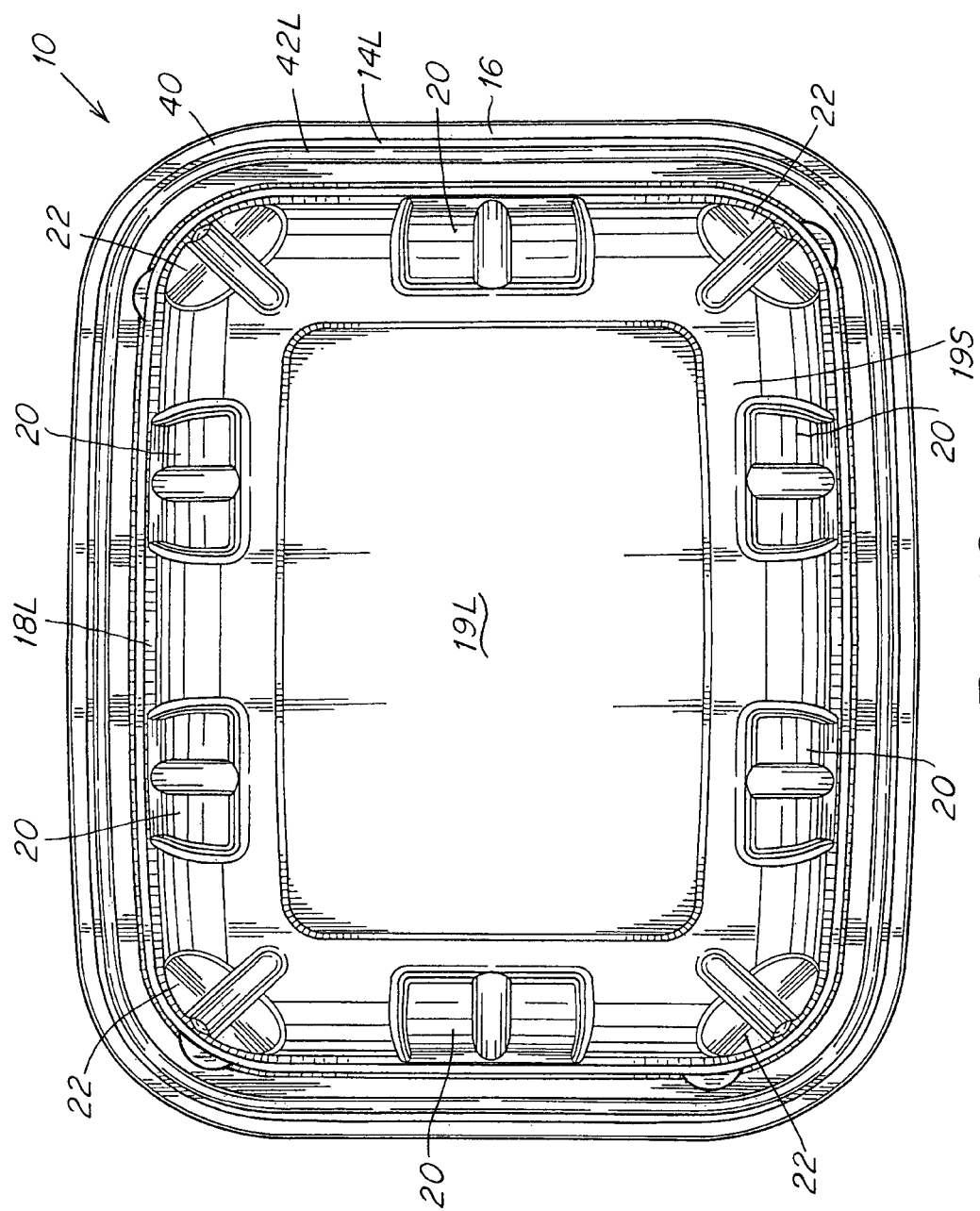
Figure 1D:
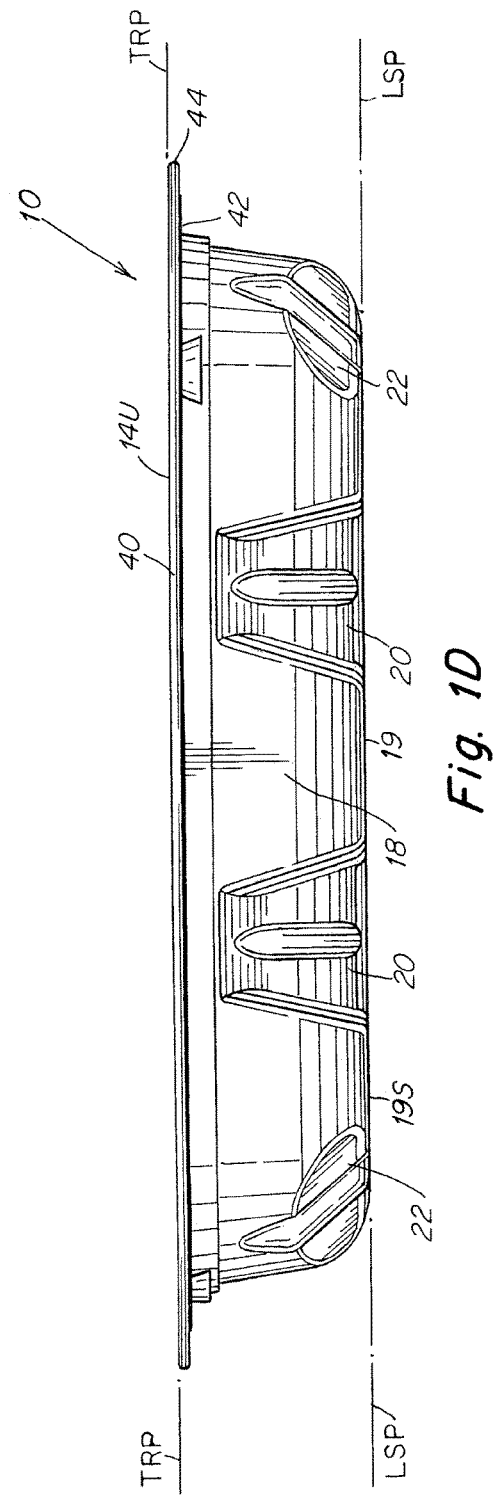
Figure 1E:
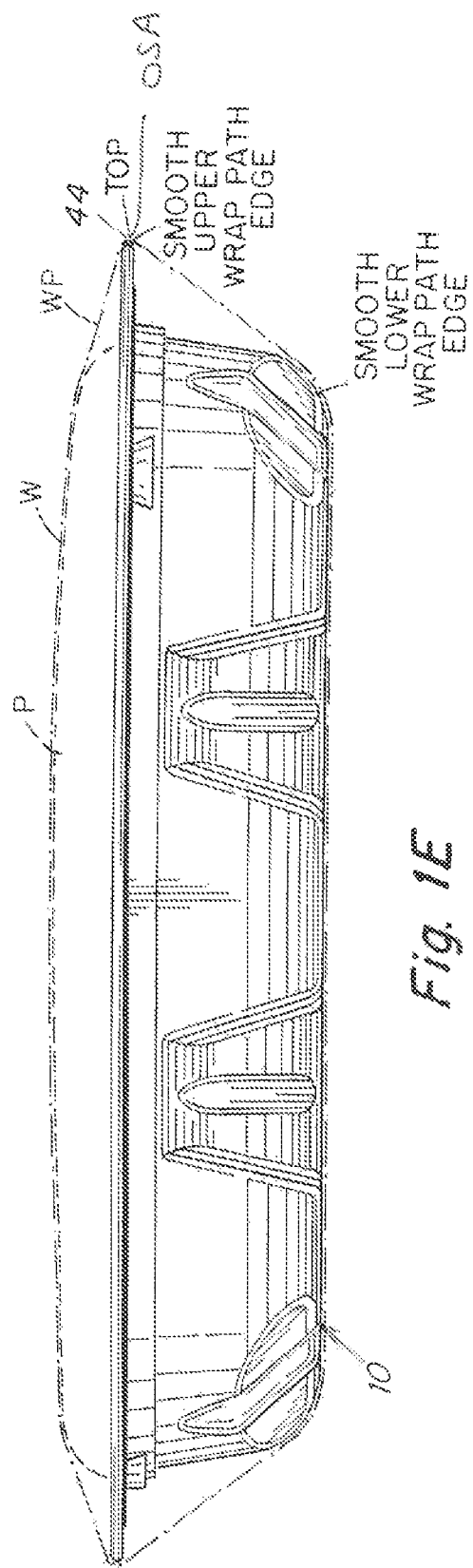
Figure 2:
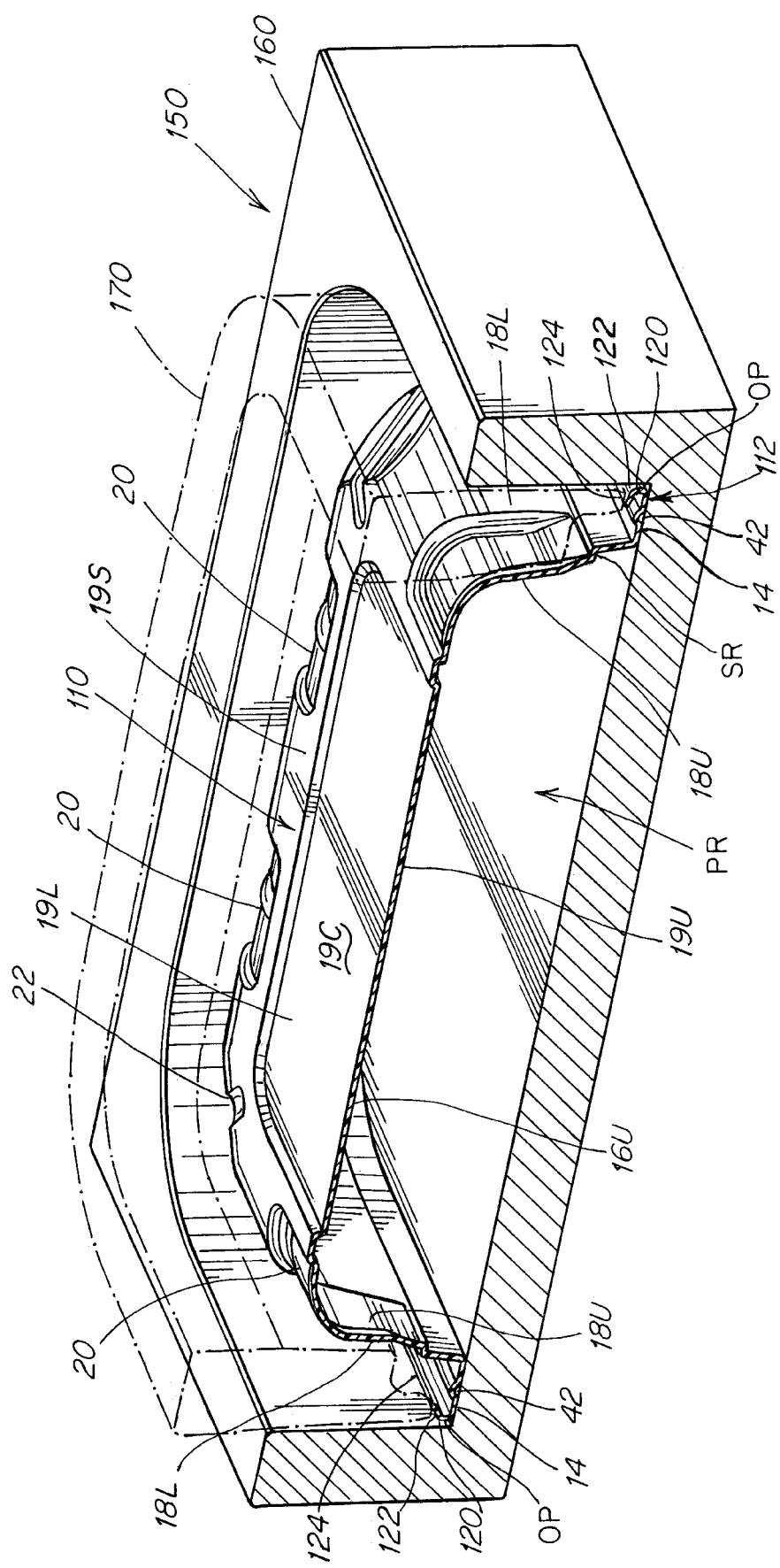
FIG. 2 is a perspective view of an intermediate article positioned in an edge forming tool assembly for forming the cold compressed flat peripheral edge on the tray of FIGS. 1A-1E.

FIGS. 1-3 illustrate a plastic packaging tray and a method of forming the tray according to a first embodiment of the invention. In this embodiment the tray has a cold compressed flat peripheral edge region comprising a fold line at the outermost periphery and mating engaged upper and lower flange surfaces disposed inwardly from the outermost periphery of the tray.

According to the method,
a thermoformed plastic intermediate article is provided for forming the tray, the intermediate article having a peripheral flange terminating in the terminal edge,
the peripheral flange of the intermediate article is cold pressed by bringing an appropriately configured compressing tool into engagement with the terminal edge to displace the terminal edge out of a wrap path (in which a plastic film is wrapped around the filled tray),
wherein the method further comprises:
the peripheral flange of the intermediate article having opposing upper and lower flange surfaces, and forming an open bead disposed at an outermost periphery of the article and a distal tail leg extending between the open bead and the terminal edge;
the compressing tool engaging the terminal edge of the leg to compress the open bead and distal tail leg and forming a cold compressed flat peripheral edge region comprising a fold line at the outermost periphery and mating engaged upper and lower flange surfaces disposed inwardly from the outermost periphery of the tray.

One example of such a tray and method will now be described.

FIGS. 1A-3E illustrate a first embodiment of a plastic packaging tray 10 and an intermediate article 110 that is used (as a precursor) to form the final packaging tray 10. The intermediate article 110 (FIGS. 2-3B) is thermoformed from plastic material in the shape of a tray having a central product recess PR, defined by a base wall 19 and sidewalls 18, and the PR being surrounded by a peripheral flange 112. The flange 112 forms a top wall 14 of the article 110 (and becomes the top wall of the tray 10), the top wall having a proximal end adjacent the product recess PR, and an opposing distal end terminating in an open bead 120 located at the outermost periphery OP of the article. In this embodiment the top wall has a dimple 42 formed between a first top wall portion 14A proximal the PR and a second top wall portion 14B distal to the first portion. The dimple 42 extends as a recess 42R into the top wall upper surface 14U and forms a protrusion 42P on the lower surface 14L of the flange top wall 14. The flange has opposing upper and lower flange surfaces 112U, 112L and has been shaped (by thermoforming, and an optional trimming step after thermoforming) into: a) an open bead 120 disposed at the distal end of the top wall located at the outermost periphery OP of the article, and b) a distal tail leg 122 extending between the open bead 120 and a terminal edge 124. The open bead 120 and distal tail leg 122 of the flange are subsequently displaced (folded back and flattened) in a cold press process in the assembly 150 shown in FIGS. 2 and 3A-3D, to form a final cold compressed flat peripheral tray edge 40.

Figure 3A:
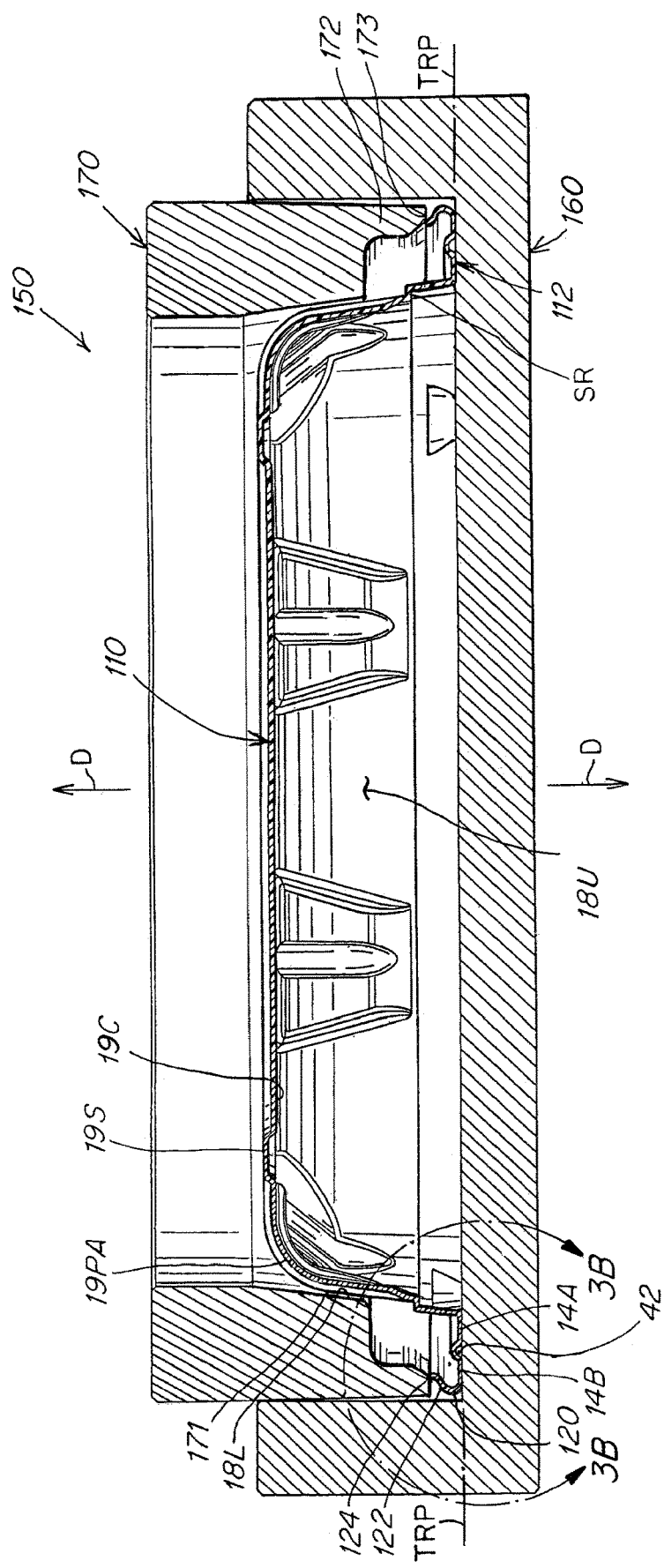
FIGS. 3A-3D are various views showing the steps of forming the tray of FIGS. 1A-1E from the intermediate article and tool assembly of FIG. 2, FIG. 3A being a cross sectional view of the assembly and article in a starting position, FIG. 3B an expanded view of the edge forming area denoted by line 3B in FIG. 3A, FIG. 3C a cross sectional view of the assembly and article (now tray) in a subsequent finish position with the final flat peripheral tray edge, FIG. 3D an expanded view of the edge forming area denoted by line 3D in FIG. 3C, and FIG. 3E being a partial cut-away bottom perspective view of the final cold compressed flat peripheral tray edge.
Figure 3B:
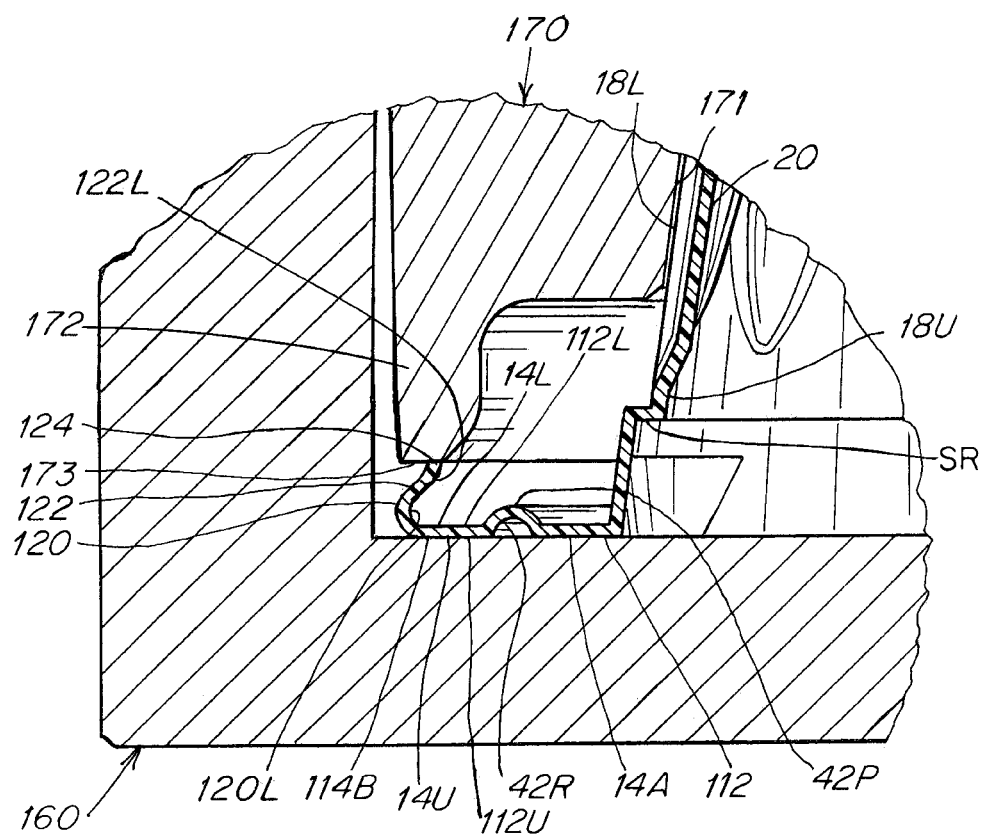
Figure 3C:
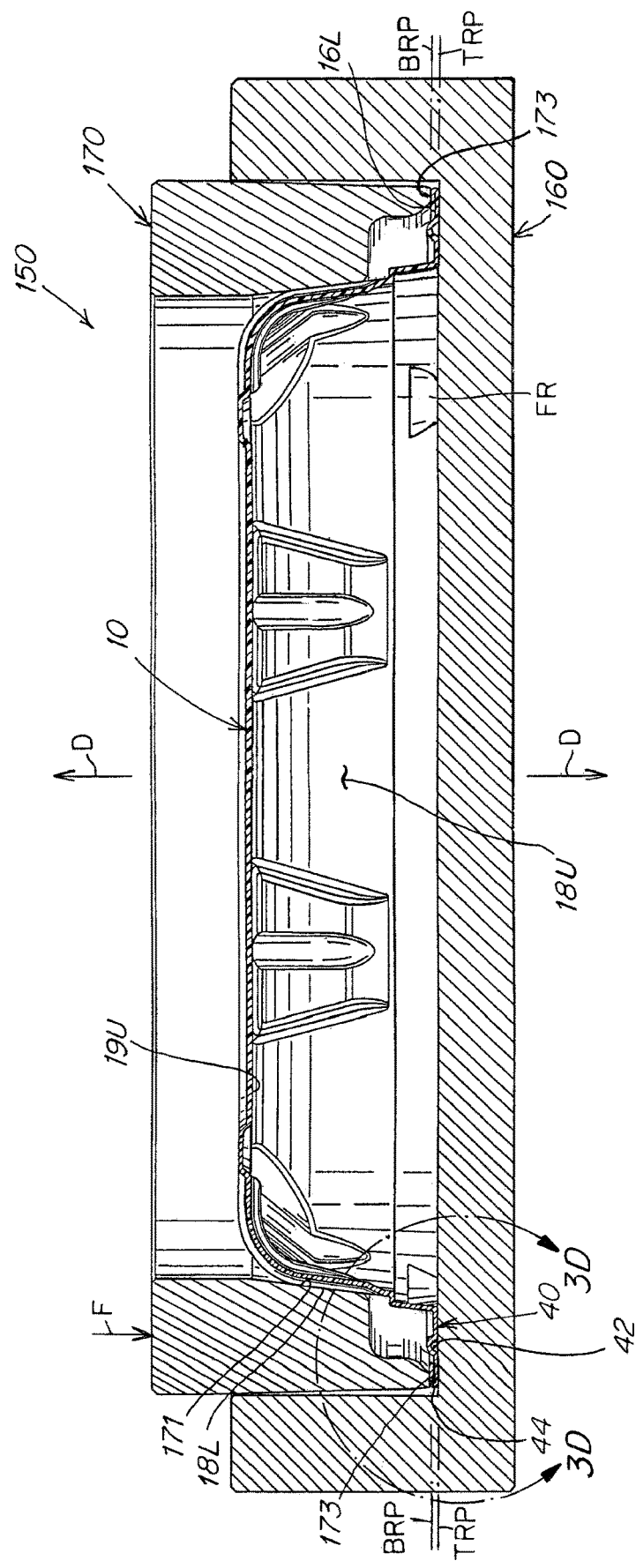
Figure 3D:
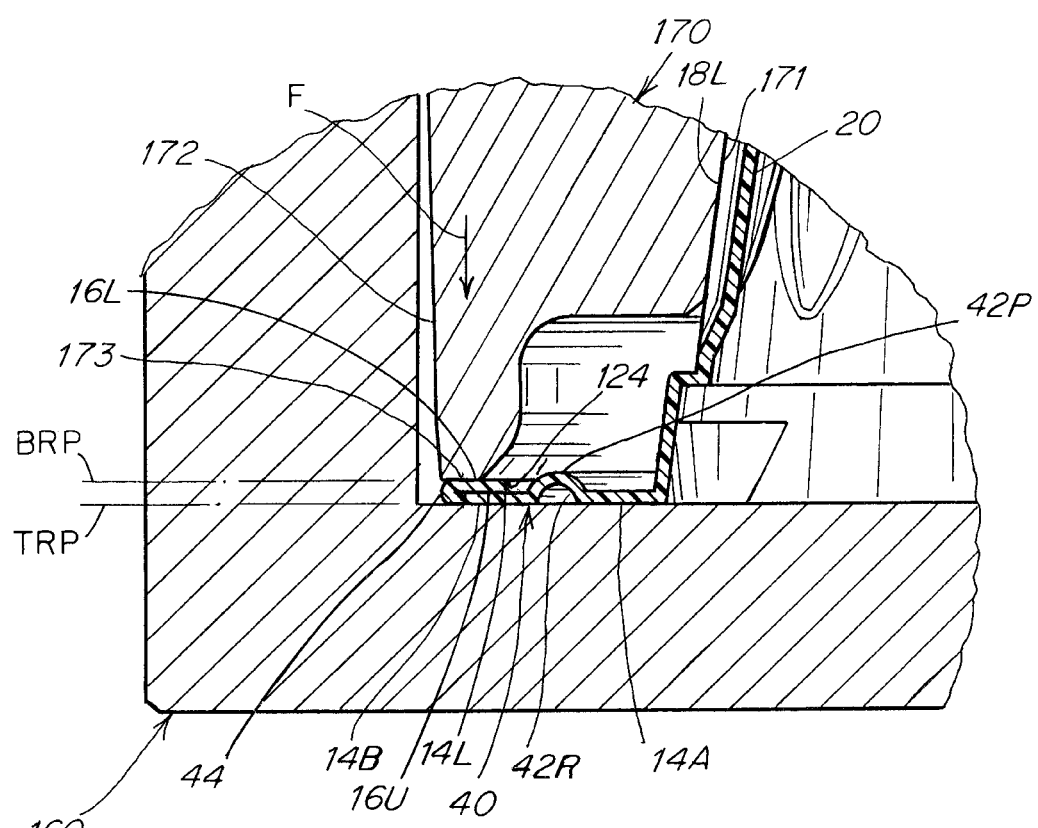
Figure 3E:
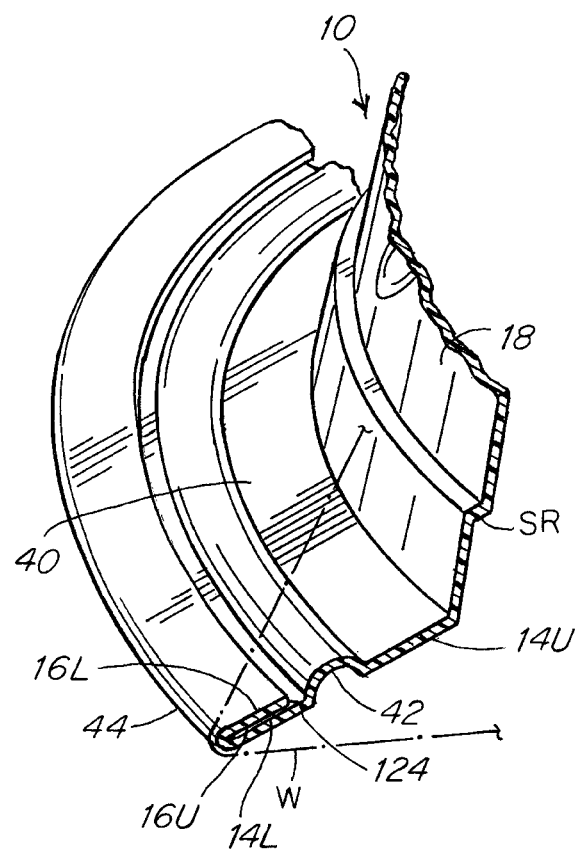

The final peripheral tray edge 40, shown in FIGS. 1A-1E and 3C-3E, has a peripheral top wall 14 (same as top wall 14 of the intermediate article 110) whose upper surface 14U defines a horizontal top reference plane TRP of the tray (see FIGS. 1D-1E and 3C-3E), and a cold pressed peripheral bottom wall 16 formed by displacing (cold pressing) the open bead 120 and distal leg 122 of the flange 112 against a lower surface 14L of the top wall. The lower surface 16L of the bottom wall defines a horizontal bottom reference plane BRP parallel to the TRP (see FIG. 3C), the top and bottom walls 14, 16 being connected at the outermost peripheral edge of the tray by a fold line 44 (a flat folded edge) and with the top wall lower surface 14L now in mating engagement with the bottom wall upper surface 16U (16 being the displaced open bead 120 and distal tail leg 122 from the cold pressing process). In this embodiment, the flat folded edge 44 extends around the complete tray outermost periphery TOP of the rectilinear-shaped tray 10, i.e., extending transversely between the TRP and BRP, and the top and bottom peripheral edge walls 14, 16 have been brought together in the assembly 150 (as shown in FIGS. 2-3D) such that adjacent mating planar surfaces (lower surface 14L of top wall 14 and previously lower surfaces 120L, 122L of the open bead and distal tail leg 120, 122 (now the upper surface 16U of tray edge bottom wall 16) are near or in direct contact over all (of substantially all) of their mating surfaces. In other words, the two planar surfaces 14L and 16U have been flattened (or crimped) together to form a flat peripheral edge 40 having a flat fold line 44 at the outermost peripheral edge of the tray 10 with mating engaged upper and lower flange surfaces 112U and 112L (now 16U and 14L of the tray) disposed inwardly from the outermost periphery of the tray.

FIGS. 1A-1E show various views of the final tray 10 as previously described, FIGS. 1A and 1B showing the upper surface 10U of the tray with a central product recess PR (to hold a product P as shown in FIG. 1E) surrounded by a peripheral edge region 40, and FIGS. 1C-1E showing the opposing lower surface 10L of the tray. The tray PR includes a base wall 19 with opposing upper 19U and lower 19L surfaces, a shallow inwardly recessed central base area 19C (optional) in the center of the base wall, and a lowermost standing surface 19S surrounding 19C, on which the tray rests (FIGS. 1C-1E). A curved peripheral area 19PA at the upper end of the base wall is joined to the lower end of the sidewalls 18, thus forming a smooth lower wrap path edge around the tray, as part of the wrap path WP shown in FIG. 1E. The flat peripheral edge region 40 forms a smooth upper wrap path edge around the tray, as part of the wrap path WP (see FIG. 1E). In use, the sidewalls and base form the inner product recess PR of the tray for holding the product between the upper surfaces 19U and 18U of the base wall and sidewalls of the tray and the lower surface of the overwrap film W (as shown in FIG. 1E).

FIGS. 2 and 3A-3D illustrate the cold press edge forming method in greater detail for forming the cold compressed flat folded peripheral edge region 40 of tray 10. By cold press (or cold compress, used interchangeably) it is meant that the no heat is required in the process of shaping the previously thermoformed flange 112 of intermediate tray 110. The cold press method provides a process that is considerably less expensive, and does not require complex and expensive modifications to the thermoforming mold. The intermediate tray 110 can be, for example, at room temperature (72 degrees Fahrenheit) while the flange is folded back on itself and compressed, such that the flange 112 is permanently deformed by stretching it past its elastic limit but within its fracture point. In this process, the typically sharp edge at the distal end 124 of the thermoformed article (formed during thermoforming or by cutting after thermoforming) is folded back towards the lower surface 112L of the flange 112 itself, as opposed to the tray body (i.e., the sidewalls 18), and the terminal edge 124 in this embodiment is finally disposed to lie near or against the protruding dimple 42P that was previously thermoformed on the lower surface 112L of the flange 112, between the proximal part 14A (near the sidewalls 18) and the opposing distal part 14B of the top wall 14 of the thermoformed flange 112 (as shown in FIG. 3B). One example of the process will now be described in greater detail.

A vertical cross section of an intermediate thermoformed article 110 is shown in FIGS. 3A-3B in an initial start position in an edge-forming assembly 150 (subsequent to thermoforming in a thermoforming mold, not shown). The intermediate article 110 (as thermoformed) includes a generally rectilinear-shaped and planar base wall 19, lying in a horizontal plane LSP, with a central rectilinear recessed base area 19C, the base wall having a curved periphery 19PA (lying in the wrap path WP and curved to avoid tearing the wrap film) that is smoothly connected to the surrounding upstanding peripheral sidewalls 18. The sidewalls 18 are generally rectilinear-shaped (in horizontal cross section parallel to the TRP), with opposing front and rear sidewalls disposed in a length direction L, opposing left and right sidewalls disposed in a width direction W, and with four rounded corner sidewalls 18C connecting adjoining length and width sidewalls. The length and/or width sidewalls may (optionally) each have structural re-enforcements in the form of ribs/recessed portions 20, and the corner sidewalls may (optionally) also have structural re-enforcements in the form of ribs/recessed portions 22. The sidewalls 18 may (optionally) also include, as a nesting/stacking feature (to facilitate the spaced nesting of multiple articles or trays in a vertical stack, and subsequent de-nesting of individual articles or trays from the stack of articles or trays), shoulder rims SR extending around an upper portion of the sidewalls, parallel to the TRP, and finger-tip recesses FR to further facilitate grasping and separating the nested articles or trays (see FIG. 1A).

Returning to FIGS. 2 and 3A-3D, the intermediate (previously thermoformed) article 110 is disposed in an edge forming assembly 150 between a first edge-forming tool 170 and a second edge-forming tool 160. The first and second edge-forming tools are movable with respect to one another, in a displacement direction D (here transverse to the TRP of the intermediate article 110), in order to apply a displacement force F on the terminal edge 124 of the article 110 in order to fold the distal end of the flange 112 back onto itself. The first tool 170 has an inner sidewall surface 171 that mates with the lower surfaces 18L of the tray sidewalls; in this embodiment both 171 and 18L have complimentary tapering surfaces (at an acute angle to D), the sidewall surfaces 18L being outwardly bowed at the top end (near the TRP) compared to the lower end of the sidewalls (near the base wall 19). The first tool has disposed at the bottom end of the sidewall 171, a forming surface 172 for engaging and displacing (compressing) the flange 112. More specifically, the forming surface 172 includes a distal most flat end surface 173 that engages the terminal edge 124 of the distal leg 120 of flange 112, in order to apply a force F, transverse to the edge 124, when the first tool and second tools move toward each other, to displace and flatten the open bead 120 and distal leg 122 to a position lying against the lower surface 14L of the top wall 14 of the flange 112 (in the final position as shown in FIGS. 3C and 3D). In the final position, the terminal edge 124 of flange 112 (same as terminal edge 124 of peripheral edge region 40 on the final tray 10) is now positioned adjacent the protruding lower surface of the dimple 42P that protrudes from the lower surface 14L of the top wall of the flange (now top wall lower surface 14L of the tray), thus placing the typically sharp terminal edge 124 out of the wrap path in an inaccessible position (below the top wall and adjacent the protruding dimple 42). Thus, when a thin plastic film wrap W (e.g., a cling wrap film comprising low density polyethylene) is applied around the packaging tray 10, i.e., around the outermost periphery TOP of the tray top wall 14 and the outermost periphery 19PA of the base wall, namely the wrap path WP as shown in FIG. 1E, the wrap W cannot engage the sharp terminal edge 124 (and thus the film W is not torn by 124 or the peripheral edge region 40).

Second Embodiment

Figure 4A:
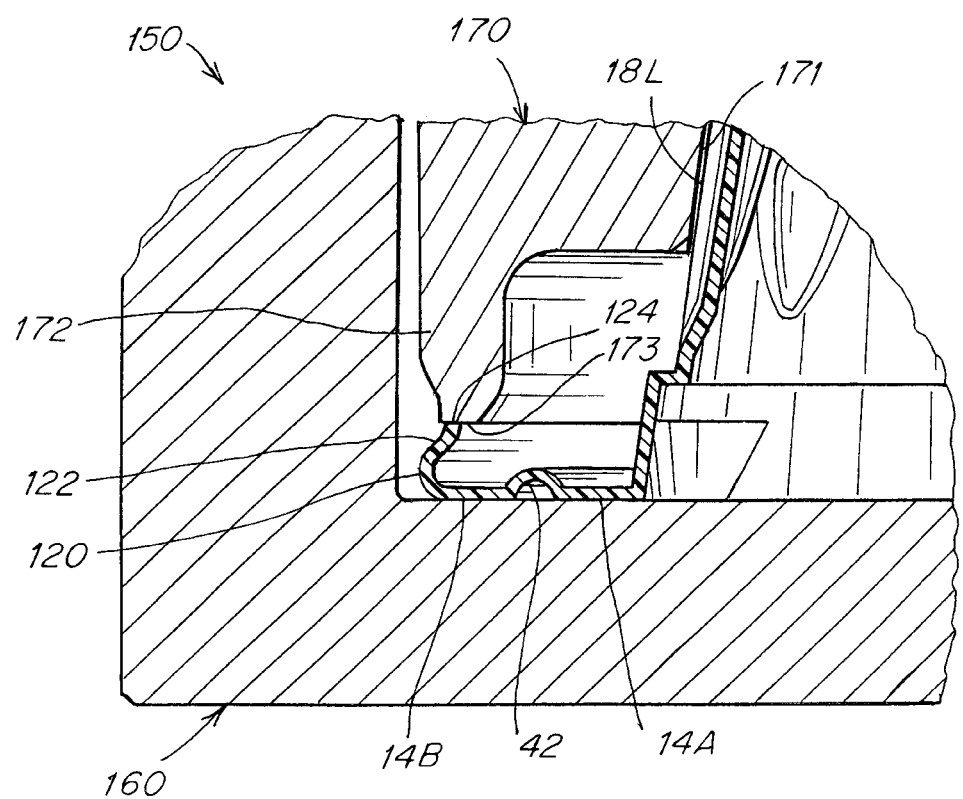
FIGS. 4A-4B and 5 are various views of a plastic packaging tray having a cold compressed beaded peripheral edge according to a second embodiment of the invention, and the steps of forming the beaded edge in an assembly similar to that of FIG. 2 but with a differently configured compressing tool, FIG. 4A showing a starting position (similar to FIG. 3B), FIG. 4B a finish position (similar to FIG. 3D) with the final edge including a bead at the outermost peripheral edge of the tray, and FIG. 5 being a partial cut-away bottom perspective view of the final cold compressed beaded peripheral tray edge.
Figure 4B:
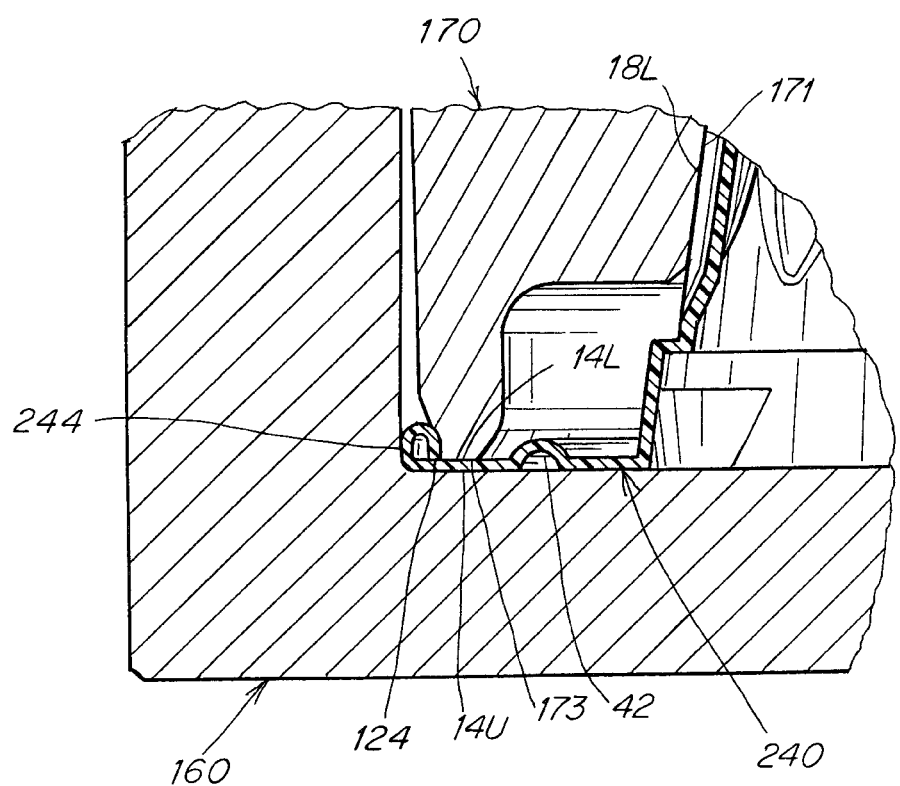
Figure 5:
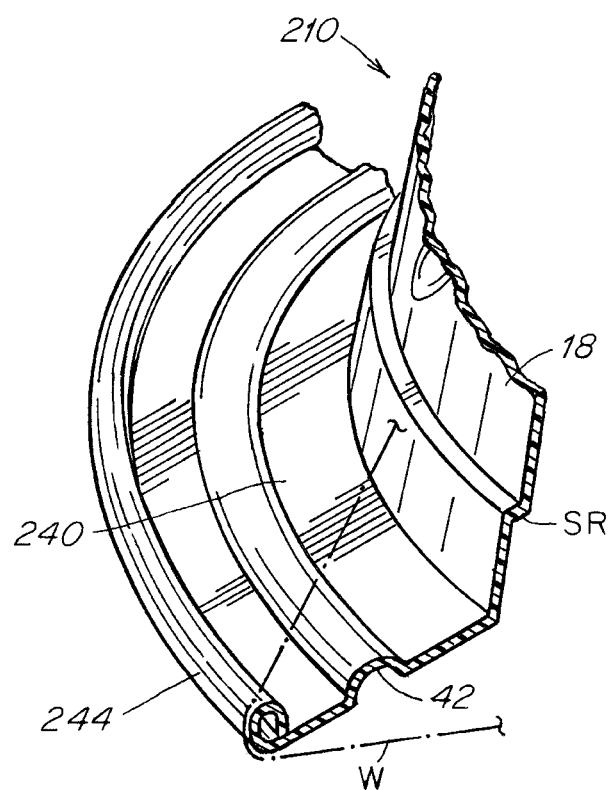

FIGS. 4-5 illustrate a tray and a method of forming the tray according to a second embodiment of the invention. In this second embodiment the tray 210 has a beaded compressed edge 240, wherein the open bead and tail leg of the intermediate article have been cold pressed to form a fully or partially closed compressed bead 244 at the outermost periphery of the tray.

According to the method,
a thermoformed plastic intermediate article is provided for forming the tray, the intermediate article having a peripheral flange terminating in a terminal edge,
the peripheral flange of the intermediate article is cold pressed by bringing an appropriately configured compressing tool into engagement with the terminal edge to displace the terminal edge out of a wrap path (in which a plastic film is wrapped around the filled tray),
wherein the method further comprises:
the peripheral flange of the intermediate article forming an open bead disposed at an outermost periphery of the article and a distal tail leg extending between the open bead and the terminal edge;
the compressing tool engaging the terminal edge of the leg to compress the open bead and distal tail leg and form a cold compressed beaded peripheral edge region in which the fully or partially closed bead forms a compressed bead disposed at the outermost periphery of the tray.

One example of such a tray and method will now be described.

As shown in FIGS. 4A-4B, the tray 240 may be formed in an alternative edge-forming method/assembly embodiment utilizing the same or a similar thermoformed intermediate article 110 and flange 112 disposed in a starting position of the assembly 150 (similar to that shown in FIG. 3A). However, in this embodiment, there are differences in one or more of the first and second tool shapes and/or dimensions, the speed and/or direction of movement of the first and second tools, the intermediate article material composition and/or thicknesses and/or other dimensions of the flange portions, which cause the flange 112 to form an alternative peripheral edge region 240 on the final tray 210 as shown in FIG. 4B. More specifically, in this embodiment the open bead 120 and distal tail leg 122 of the article flange 112 are displaced (cold pressed) to form a tight (closed or substantially closed) compressed bead 244 at the outermost periphery TOP of the final tray edge region 240, thus disposing the sharp terminal edge 124 safely tucked away from (prevented from engaging) the wrap film W surrounding the filled tray. The terminal edge 124 is positioned substantially within the circumference of the tight (substantially circular and closed onto itself) bead 244, and the bead 244 lies adjacent the lower top wall surface 14L at the distal end 14DE of the top wall 14. The wrap film W thus engages a tightly beaded corner 244 and is kept out of contact with the sharp terminal edge 124, as shown in FIG. 5.

Third Embodiment

FIGS. 6A-6G illustrate a tray 310 and a method of forming the tray according to a third embodiment of the invention. In this third embodiment the tray 310 has a combined beaded and flat compressed edge 340, wherein the open bead 120 and tail leg 122 of the intermediate article have been cold pressed to form a fully or partially compressed bead 344 at the outermost periphery of the tray and mating engaged upper and lower flange surfaces 112U, 112L (16U, 14L in the finished tray) disposed inwardly from the outermost periphery of the tray.

According to the method,
a thermoformed plastic intermediate article is provided for forming the tray, the intermediate article having a peripheral flange terminating in a terminal edge,
the peripheral flange of the intermediate article is cold pressed by bringing an appropriately configured compressing tool into engagement with the terminal edge to displace the terminal edge out of a wrap path (in which a plastic film is wrapped around the filled tray),
wherein the method further comprises:
the peripheral flange of the intermediate article forming an open bead disposed at an outermost periphery of the article and a distal tail leg extending between the open bead and the terminal edge;
the compressing tool engaging the terminal edge of the leg to compress the open bead and distal tail leg and form a cold compressed combined beaded and flat peripheral edge region in which the fully or partially closed bead forms a compressed bead disposed at the outermost periphery of the tray and mating engaged upper and lower flange surfaces disposed inwardly from the outermost periphery of the tray.

One example of such a tray and method will now be described.

Figure 6A:
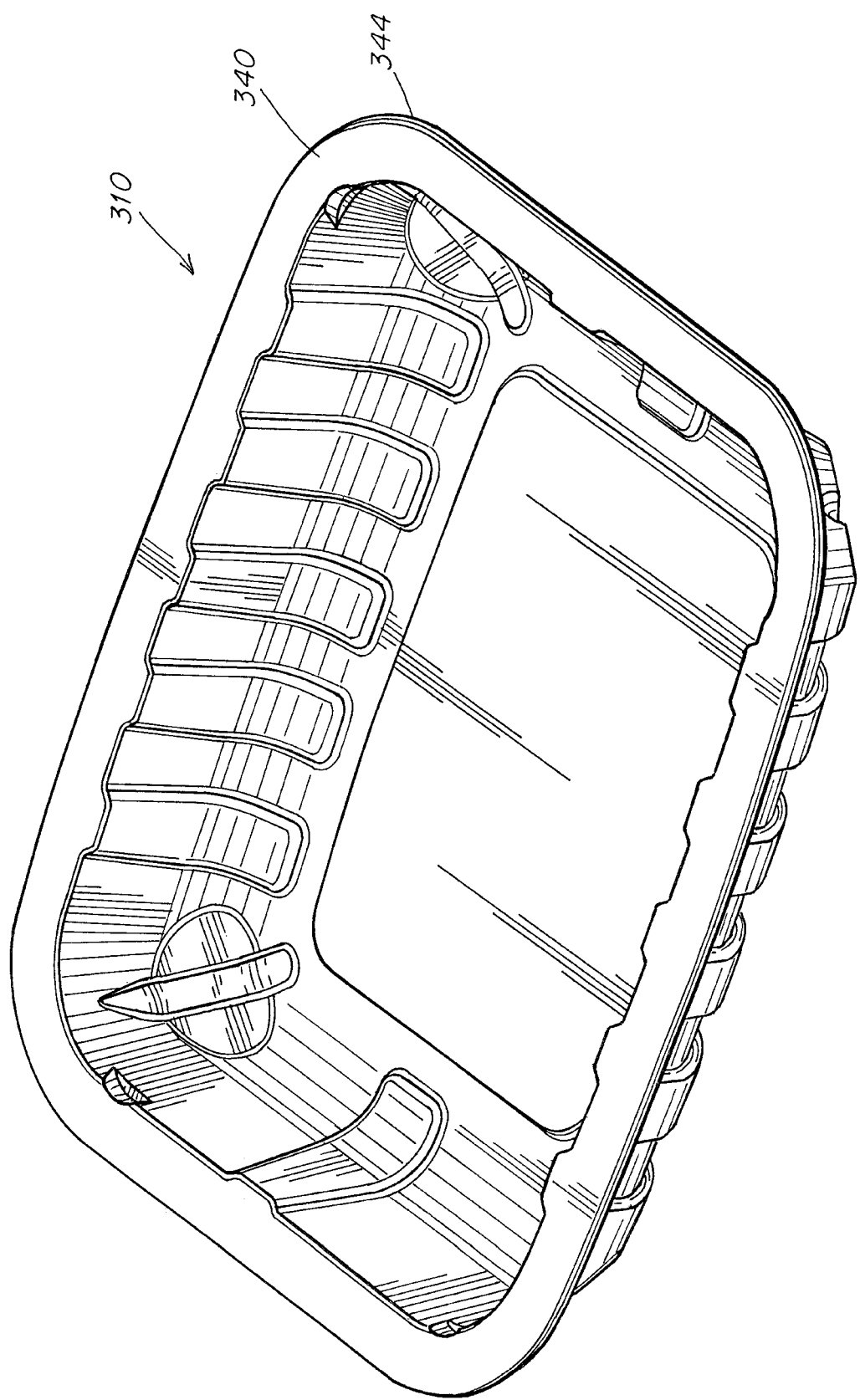
FIGS. 6A-6G are various views of a plastic packaging tray having a cold compressed combined beaded and flat peripheral edge with a compressed bead at the outermost periphery and mating engaged upper and lower flange surfaces disposed inwardly from the outermost periphery of the tray according to a third embodiment of the invention, FIG. 6A being a top perspective view (similar to FIG. 1A), FIG. 6B a front elevational view of the tray filled with a product P and wrapped in a flexible plastic film wrap W (similar to FIG. 1E), FIG. 6C a cross sectional view of an assembly and intermediate article in a starting position (similar to FIG. 3A), FIG. 6D an expanded view of the edge forming area denoted by line 6D in FIG. 6C (similar to FIG. 3B), FIG. 6E a cross sectional view of the assembly and tray in a subsequent finish position (similar to FIG. 3C), FIG. 6F an expanded view of the edge forming area denoted by line 6F in FIG. 6E (similar to FIG. 3D), and FIG. 6G being a partial cut-away bottom perspective view (similar to FIG. 3E) of the final cold compressed combined beaded and flat peripheral tray edge.
Figure 6B:
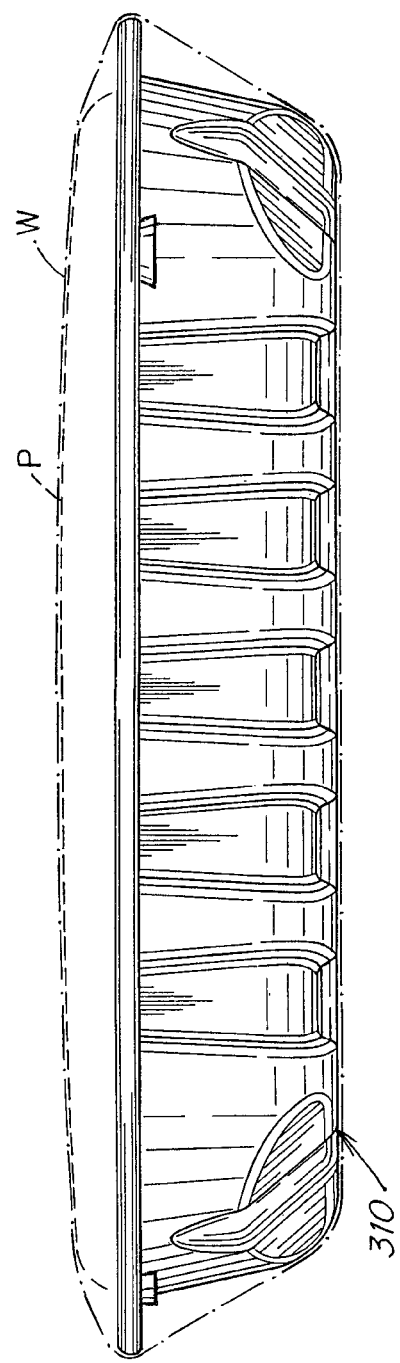
Figure 6C:
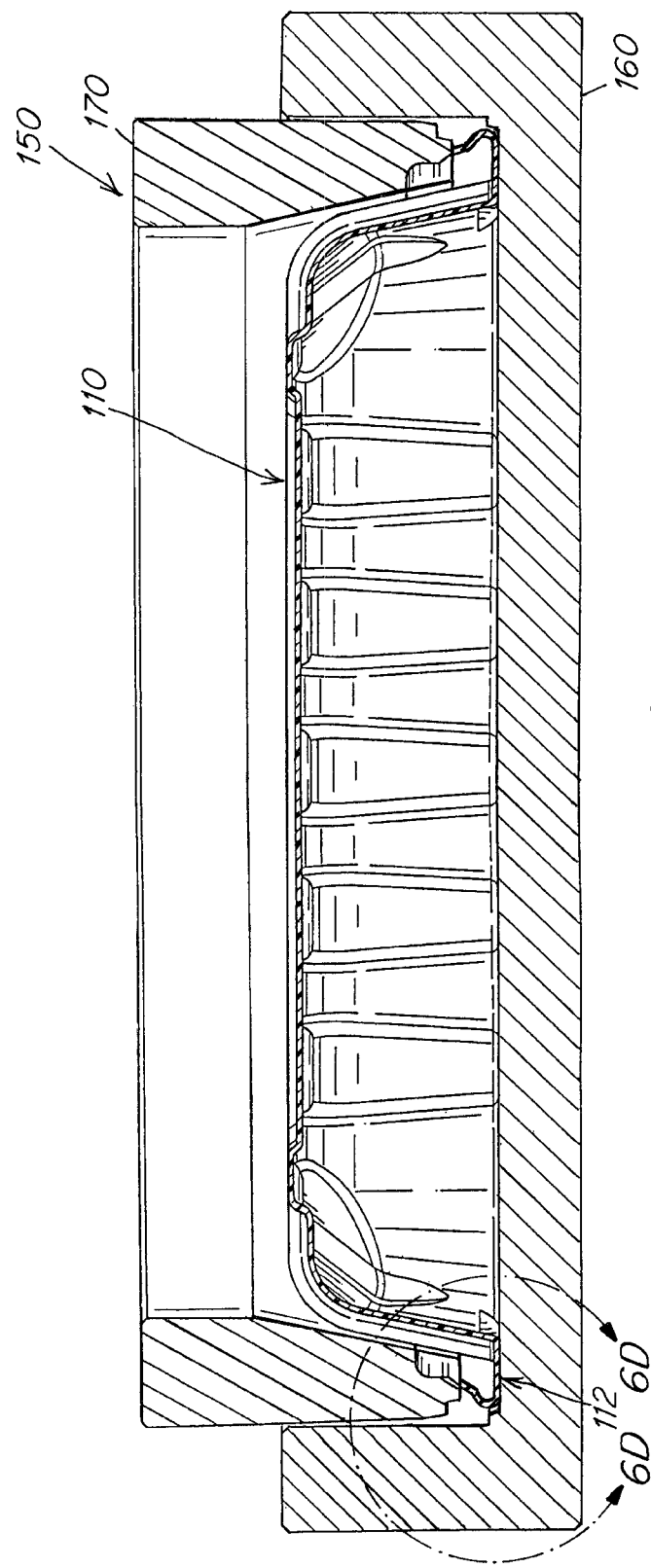
Figure 6D:
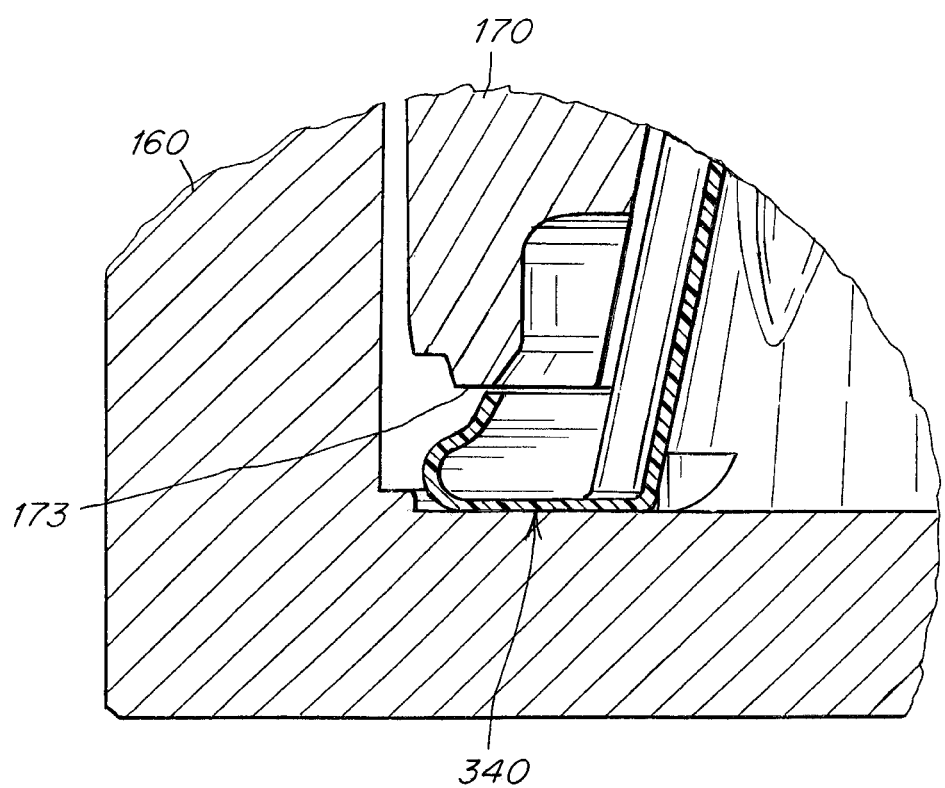
Figure 6E:
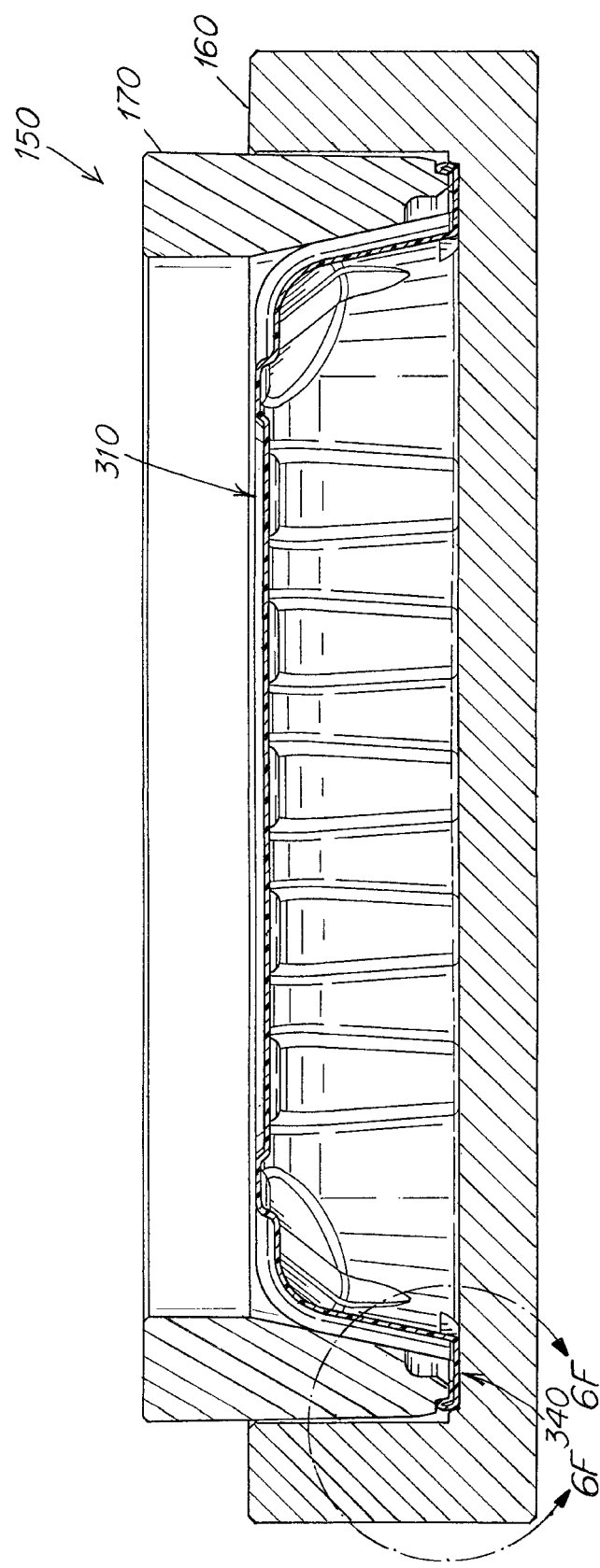
Figure 6F:
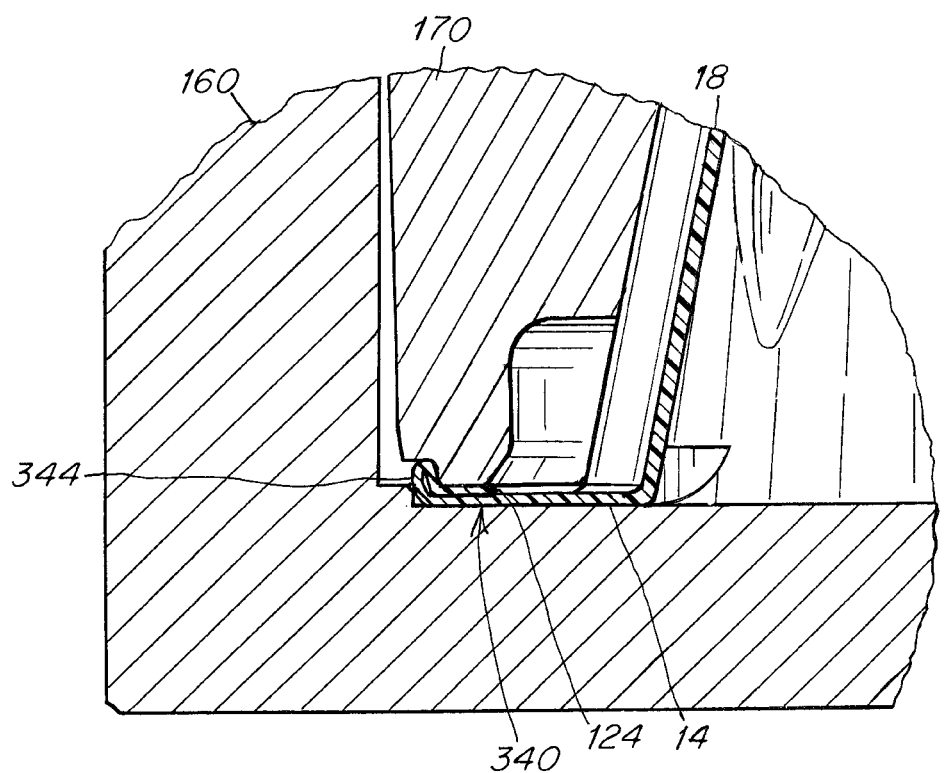
Figure 6G:
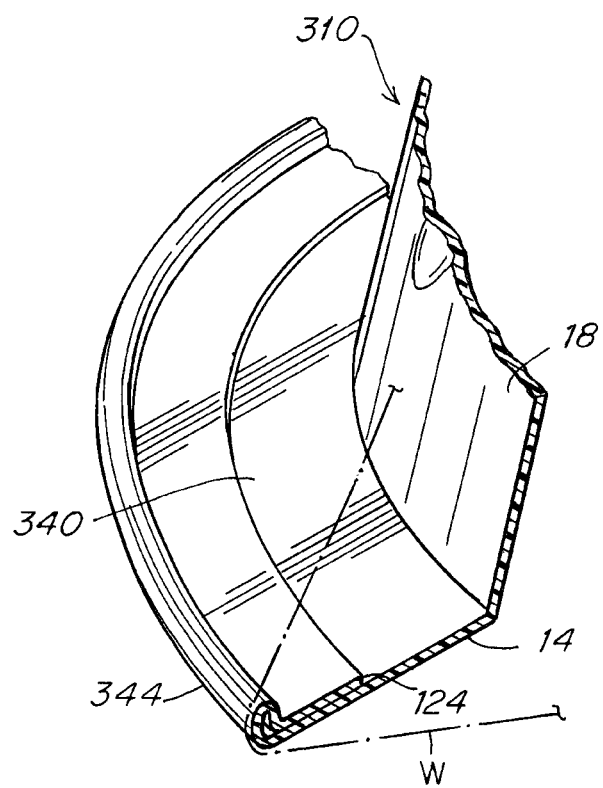

As shown in FIGS. 6A-6B, the tray 340 may be formed in and alternative edge-forming assembly/method embodiment, similar to that of FIGS. 2-3D. FIGS. 6A-6B are view of the final tray 310, similar to views 1A and 1E of the first embodiment, and corresponding elements of the tray have been given the same reference numerals. FIGS. 6C-6F, similar to FIGS. 3A-3E and with the same reference numerals for corresponding elements of the intermediate article, tool assembly and final tray, illustrate an alternative edge-forming assembly/method embodiment, utilizing the same or a similar thermoformed intermediate article 110 and flange 112 disposed in a starting position of the assembly 150 (similar to that shown in FIG. 3A). However, in this embodiment, there are differences in one or more of the first and second tool shapes and/or dimensions, the speed and/or direction of movement of the first and second tools, the intermediate article material composition and/or thicknesses and/or other dimensions of the flange portions, causing the flange 112 to form an alternative peripheral edge region 340 on the final tray 310 as shown in FIG. 6E-6G. More specifically in this embodiment the open bead 120 and distal tail leg 122 of the article flange 112 are displaced (cold pressed) to form a tight flat compressed bead 344 at the outermost periphery of the final tray edge region 340, and engaged mating flange surfaces 112U, 112L disposed inwardly from the outermost tray periphery TOP. There is no dimple in this embodiment. The sharp terminal edge 124 lies flat against the lower surface 14L of the tray top wall and is safely tucked away from (prevented from engaging) the wrap film W surrounding the filled tray. The wrap film W thus engages a tightly beaded corner 344 and is kept out of contact with the sharp terminal edge 124, as shown in FIG. 6G.

ADDITIONAL FEATURES AND ALTERNATIVES

Figure 7A:
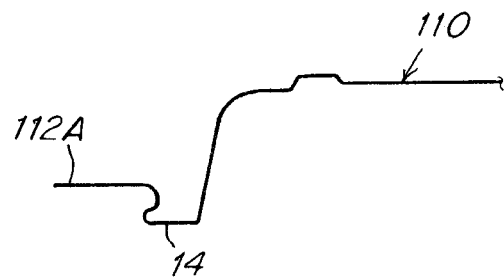
FIGS. 7A-7C are schematic views of an edge trimming apparatus for forming a terminal edge on the thermoformed intermediate article.
Figure 7B:
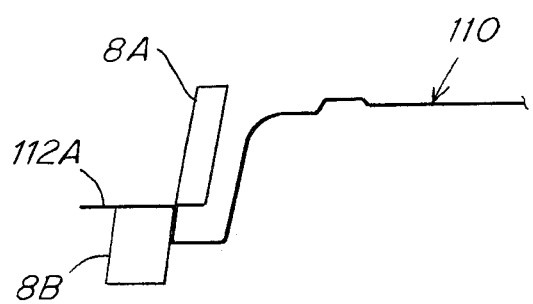
Figure 7C:
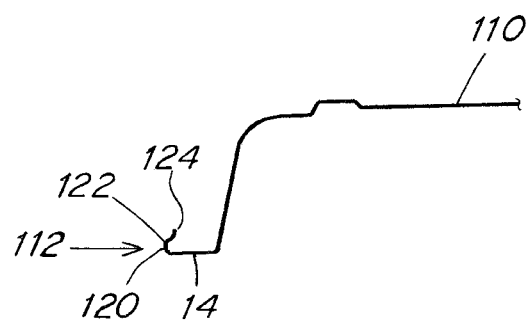

FIGS. 7A-7B illustrate one method and apparatus for trimming a thermoformed article 110 to form a peripheral flange 112 having a terminal edge 124 such as that shown in the prior embodiments. FIG. 7A is a schematic cross sectional view of one sidewall and peripheral edge of the thermoformed intermediate article 110, having an outwardly extending peripheral terminal flange portion 112A that extends substantially parallel to the top wall 14 of the article. FIG. 7B shows a cutting tool 8A, 8B that both stretches and cuts off an outermost terminal portion 112A of the flange, leaving the open bead 120 and distal leg 122 of the peripheral flange 112 of the intermediate article 110 having a terminal edge 124, as shown in FIG. 3B. Other methods of trimming can be used, or no trimming may be used depending on the desired shape and dimension of the article as produced in the thermoforming mold.

In various embodiments, the thermoplastic material of the tray may be one or more of polyester, such as polyethylene terephthalate (PET), including copolymers and blends of PET with other polymers and additives, and including recycled PET and barrier materials (to gas or moisture) and other rigid tray forming polymers. In other embodiments, the thermoplastic may be various other plastics commonly used for forming solid and rigid thermoformed trays (e.g. polyolefin polymers such as high density polyethylene (HDPE), with or without other polymers or additives). In one embodiment, the plastic forms a substantially transparent and solid polymer tray. The overwrap film may be any of various thin and flexible polymer films, such as those made of polyethylene (PE), including low density PE. Other materials may be suitable.

In various embodiments, the thermoformed plastic intermediate article comprises a monolayer or multi-layer article, and comprises a foam, solid or a combination of foam and solid material(s). The material(s) may comprise one or more of polyolefin and polyester materials, in an amorphous or semi-crystalline state. The material(s) may comprise one or more of amorphous polyethylene terephthalate, semi-crystalline polyethylene terephthalate, polypropylene, polystyrene, polyethylene, and high density polyethylene. The article may have dimensions in ranges of: thickness from 0.01 to 0.06 inches, height (transverse to the TRP) from 0.5 to 2.5 inches, and top surface area (in TRP) from 5.0 inches in length×5.0 inches in width to 17 inches in length×15 inches in width.

In one embodiment, the edge-forming process may include an elevated temperature (e.g., above room temperature of 72 degrees Fahrenheit), either as residual heat in the thermoformed intermediate tray or applied heat prior to or during the edge-forming process. However, this additional heat is not required and the time and equipment costs of heating, or maintaining a processing temperature window (range), can be avoided.

In various embodiments, the container can be of various shapes, including non-rectilinear shapes such as round or oval.

In various embodiments, the dimensions and/or orientation of the flat folded corner 44 and/or the beaded corner 244, 344 can be controlled by adjusting the travel (speed or path) of the inner tool 170 with respect to the outer tool 160.

In various embodiments, the article flange 112 (and resulting tray top wall) may not have a dimple 42. The terminal edge 124 of the flange may still be disposed adjacent the lower surface 16L of the bottom wall 16 to avoid contact with the overwrap film W.

In various embodiments, the final position of the terminal edge 124 of the flange may be varied so as to be closer to or further from the lower surface of the sidewall 18L.

Figure 8:
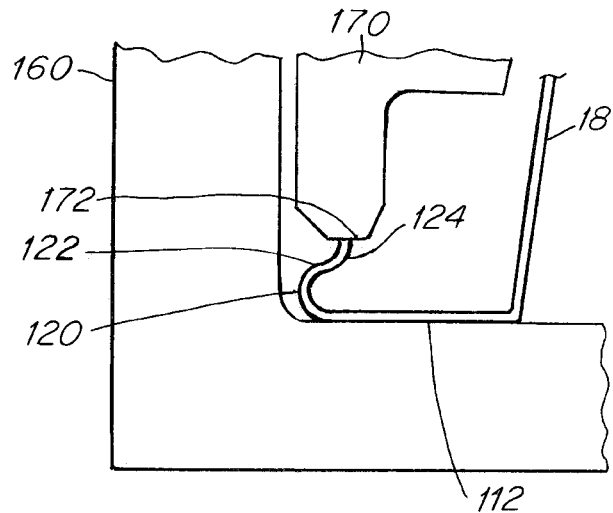
FIGS. 8 and 8A-8D are various views showing an apparatus and method for varying the dimensions of the final bead on the outermost periphery of the tray, and thus the surface area that lies in the wrap path W.
Figure 8A:
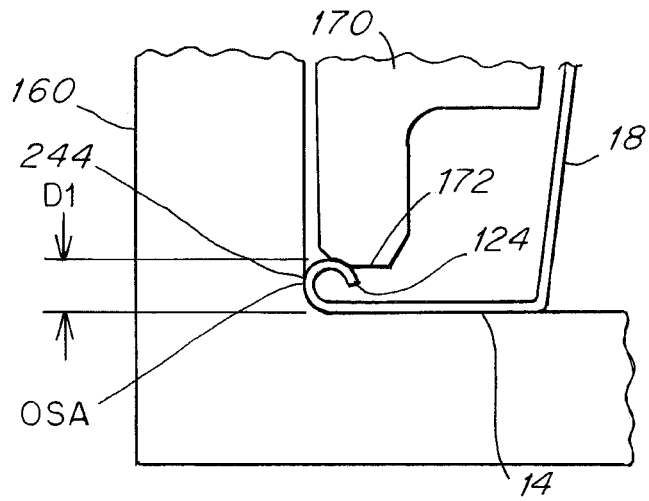
Figure 8B:
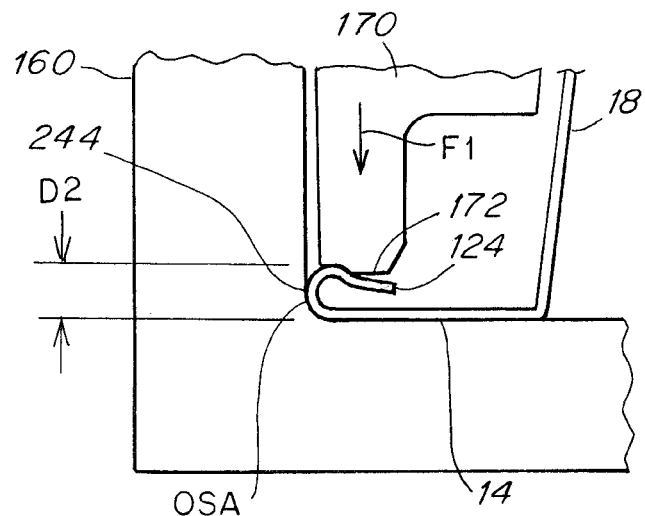
Figure 8C:
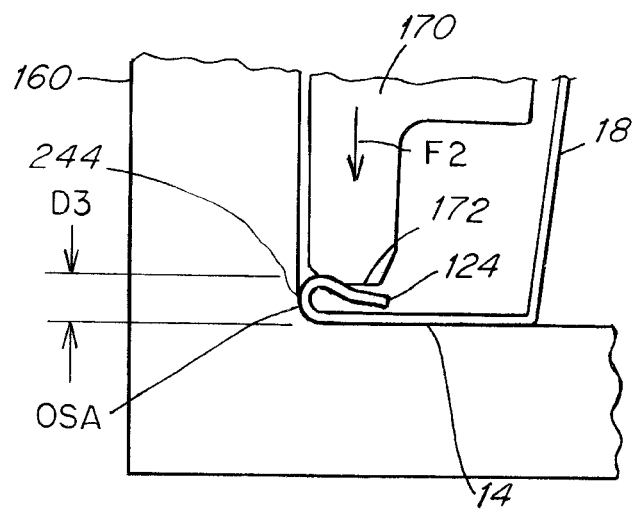
Figure 8D:
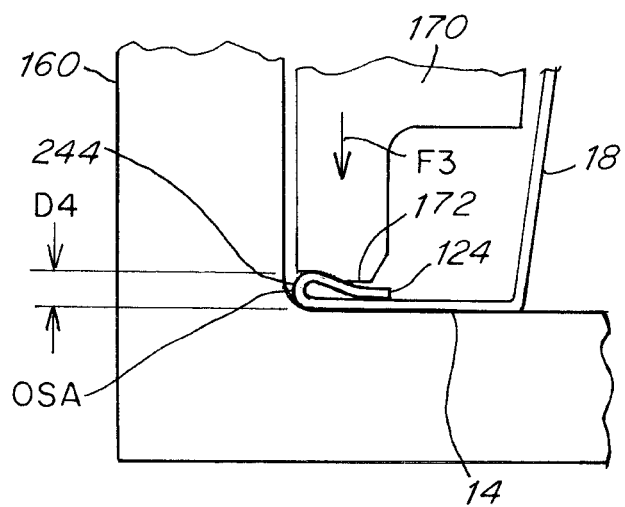

In various embodiments, the final bead formed at the outermost periphery of the tray may range from a relatively larger open bead to a relatively smaller bead depending on how tightly the open bead 120 and tail leg 122 are displaced and folded back onto the top wall 14. FIGS. 8 and 8A-8D show a method of varying the outer surface area OSA of the peripheral bead 244 on the tray and thus the amount of the outer surface area that lies in the wrap path W (see FIG. 1E). As noted previously, a larger surface area in the wrap path will typically increase the tautness by which the wrap film clings to the tray and product, providing a more secure sealed package. FIG. 8 is similar to FIG. 3B, showing a peripheral edge portion of the intermediate article in the edge compressing apparatus 160, 170 in the start position, while FIGS. 8A through 8D show varying amounts of applied force F and/or speed of travel S by the first tool surface 172 to the terminal edge 124, resulting in different final configurations of the bead 244 at the outermost periphery of the final tray 10. The final bead dimension D in the height direction, transverse to the TRP, ranges from a larger and open bead of height D1 in FIG. 8A, through increasingly smaller bead dimensions D2, D3 and D4 as the bead becomes smaller (tighter) due to great application of force F and/or greater speed S during the cold pressing process (FIGS. 8B-8D).

These and other variations are within the scope of the invention as set forth in the appended claims

What is claimed is:

1. A method of producing a plastic packaging tray, the tray having a cold compressed flat peripheral edge region comprising a fold line at its outermost periphery and mating engaged upper and lower flange surfaces disposed inwardly from the outermost periphery of the tray and terminating in a terminal edge that is displaced out of a wrap path around the tray, the method comprising:

providing a thermoformed plastic intermediate article having a thermoformed peripheral flange terminating in a terminal edge, the thermoformed peripheral flange of the intermediate article having opposing upper and lower flange surfaces, and forming an open bead disposed at an outermost periphery of the thermoformed article and a distal tail leg extending between the open bead and the terminal edge;

cold pressing the peripheral flange of the thermoformed intermediate article by bringing an appropriately configured compressing tool into engagement with the terminal edge to displace the terminal edge, the compressing tool engaging the terminal edge of the leg to compress the open bead and distal tail leg and form a cold compressed flat peripheral edge region comprising a fold line at the outmost periphery and mating engaged upper and lower flange surfaces disposed inwardly from the outermost periphery of the tray.

2. The method of claim 1, wherein the cold pressing step comprises:

varying a degree by which the compressing tool displaces the terminal edge of the distal tail leg in order to vary the extent of the compressed flat peripheral edge region and fold line at the outermost periphery of the tray to provide a selected outer surface area for engagement with a wrap film disposed within the wrap path.

3. The method of claim 2, wherein the degree by which the compressing tool displaces the terminal edge produces a fully closed compressed bead at the outermost periphery of the tray.

4. The method of claim 1, wherein:

the intermediate article is thermoformed from plastic material in the shape of a tray having a central product recess PR, defined by a base wall and sidewalls, and the PR being surrounded by the peripheral flange, the peripheral flange forming a top wall of the thermoformed article (and becomes a top wall of the tray), the top wall having a proximal end adjacent the product recess PR, and an opposing distal end terminating in the open bead located at the outermost periphery OP of the thermoformed article;

the peripheral flange having the opposing upper and lower flange surfaces that have been shaped by thermoforming (and an optional trimming step after thermoforming) into: a) the open bead disposed at the distal end of the top wall located at the outermost periphery OP of the thermoformed article, and b) the distal tail leg extending between the open bead and the terminal edge, and wherein during the cold pressing step, the open bead and distal tail leg of the peripheral flange are subsequently displaced (folded back and flattened) in the cold pressing step to form the final cold compressed flat peripheral edge region of the tray.

5. The method of claim 4, wherein:

a forming surface of the tool includes a distal most flat end surface that engages the terminal edge of the distal tail leg of the peripheral flange, in order to apply a force F, transverse to the terminal edge, to displace and flatten the open bead and the distal tail leg to a position lying against the lower surface of the top wall of the tray.

6. The method of claim 5, wherein:

a thin plastic film wrap W is applied around the outermost periphery TOP of the tray top wall and the outermost periphery of the base wall, to form the wrap path WP, wherein the wrap W does not engage the terminal edge.

7. A plastic packaging tray produced by the method of claim 1, wherein the thermoformed plastic intermediate article is formed with a product recess surrounded by the peripheral flange.

8. The plastic packaging tray of claim 7, wherein the tray has a rectangular shaped outermost periphery with rounded corners.

9. The plastic packaging tray of claim 7, wherein the peripheral flange has a proximal portion forming a top wall of the article disposed between the product recess and the open bead, and a distal portion including the open bead and distal tail leg.

10. The plastic packaging tray of claim 9, wherein a dimple comprising a recess extends into an upper surface of the top wall and protrudes from a lower surface of the top wall.

11. The plastic packaging tray of claim 10, wherein the terminal edge is disposed in the tray adjacent the lower surface of the top wall between the dimple and the outermost periphery of the tray.

12. A wrapped and filled plastic packaging tray produced by the method of claim 1, followed by filling the tray with a product and positioning a sheet of plastic wrap film over the tray and product disposed therein and pulling the sheet taut to engage the outermost periphery of the tray in the wrap path without engaging the terminal edge.

13. The wrapped and filled plastic tray of claim 12, wherein the thermoformed plastic intermediate article comprises a monolayer or multi-layer article, and comprises a foam, solid or a combination of foam and solid material(s).

14. The wrapped and filled plastic tray of claim 13, wherein the material(s) comprise one or more of polyolefin and polyester materials, in an amorphous or semi-crystalline state.

15. The wrapped and filled plastic tray of claim 13, wherein the material(s) comprise one or more of amorphous polyethylene terephthalate, semi-crystalline polyethylene terephthalate, polypropylene, polystyrene, polyethylene, high density polyethylene, and the article has dimensions in ranges of: thickness from 0.01 to 0.06 inches, cavity depth from 0.5 to 2.5 inches, and top surface area from 5.0 inches in length ×5.0 inches in width to 17 inches in length to 15 inches in width.

16. An apparatus for producing the plastic packaging tray of claim 1, wherein a forming surface of the tool includes a distal most flat end surface that engages the terminal edge of the distal tail leg of the peripheral flange, in order to apply a force F, transverse to the terminal edge, to displace and flatten the open bead and the distal tail leg to a position lying against the lower surface of the top wall of the tray.

17. The apparatus of claim 16, wherein the degree by which the compressing tool displaces the terminal edge produces a fully closed compressed bead at the outermost periphery of the tray.

18. A plastic packaging tray produced by the apparatus of claim 16, wherein the thermoformed plastic intermediate article is formed with a product recess surrounded by the peripheral flange.

* * * * *